United States Patent [19]

Becker et al.

[11] 4,130,195
[45] Dec. 19, 1978

[54] ARCUATE PUSH-BAR CONVEYOR

[75] Inventors: Roger T. Becker, Kalamazoo; Donald L. Burns, Oshtemo; Stephen P. Calkins, Three Rivers, all of Mich.

[73] Assignee: Kalamazoo Conveyor Company, Kalamazoo, Mich.

[21] Appl. No.: 789,876

[22] Filed: Apr. 22, 1977

[51] Int. Cl.² .............................................. B65G 25/08
[52] U.S. Cl. .................................. 198/739; 198/743; 198/747
[58] Field of Search ............... 198/723, 736, 740, 741, 198/743, 745, 746, 749, 739; 51/240 T, 270; 83/153; 29/403, DIG. 94, DIG. 98; 74/89, 89.2

[56] References Cited

U.S. PATENT DOCUMENTS

| 3,128,876 | 4/1964 | Kay et al. | 198/747 |
| 3,175,677 | 3/1965 | Peras | 198/745 |
| 3,493,099 | 2/1970 | Fink | 198/723 |
| 3,542,187 | 11/1970 | Assauer | 198/743 |
| 3,605,700 | 9/1971 | Gillette | 198/741 |
| 3,656,609 | 4/1972 | Okano et al. | 198/743 |
| 3,777,800 | 12/1973 | Becker et al. | 198/749 |
| 3,802,552 | 4/1974 | Gann et al. | 198/741 |
| 3,828,920 | 8/1974 | Becker et al. | 198/741 |
| 3,985,226 | 10/1976 | Noren | 198/747 |
| 3,999,671 | 12/1976 | Lutz | 198/472 |

FOREIGN PATENT DOCUMENTS

| 1193871 | 5/1965 | Fed. Rep. of Germany | 198/736 |
| 2548017 | 4/1977 | Fed. Rep. of Germany | 198/747 |
| 1558004 | 2/1969 | France | 198/736 |
| 1565139 | 4/1969 | France | 198/736 |
| 694377 | 9/1965 | Italy | 198/740 |
| 443762 | 2/1968 | Switzerland | 198/736 |
| 391935 | 5/1933 | United Kingdom | 198/736 |
| 395432 | 7/1933 | United Kingdom | 198/736 |
| 831184 | 3/1960 | United Kingdom | 198/743 |
| 1230512 | 5/1971 | United Kingdom | 198/736 |
| 384758 | 11/1973 | U.S.S.R. | 198/748 |

Primary Examiner—Evon C. Blunk
Assistant Examiner—Richard K. Thomson
Attorney, Agent, or Firm—Blanchard, Flynn, Thiel, Boutell & Tanis

[57] ABSTRACT

A harpoon or chip conveyor having an arcuate trough fitted with material retaining members or barbs on its inner sides and a plurality of interconnected plows driven in backward and forward or reciprocal motion by a reciprocating hydraulic or air operated power unit. The material retaining members are so oriented that a small vertical portion faces the direction of travel of the material being conveyed. The arcuate trough is generally greater than 90° and less than a complete 360°. An outlet is provided at least at one end of the arcuate trough for discharging the material collected in the trough in response to the reciprocal motion of the plows.

16 Claims, 11 Drawing Figures

ARCUATE PUSH-BAR CONVEYOR

FIELD OF THE INVENTION

This invention relates to a chip conveyor and, more particularly, to a type of chip conveyor having an arcuate trough and plows therein which are reciprocated in an arcuate path within the trough to effect the movement of material in the trough toward at least one outlet therefrom.

BACKGROUND OF THE INVENTION

Chip conveyors are finding widespread use in industry for many applications. Such conveyors include a long, continuous trough mounted in a floor recess or on a platform having directional material retaining members or barbs mounted on the inner side walls thereof. A plurality of linearly arranged, interconnected plows are mounted for reciprocating motion within the trough, and a power means, generally of the hydraulic type, is connected to one end of the assembly for reciprocating the entire train of plows backward and forward. Typical examples are illustrated in U.S. Pat. Nos. 3,777,880 and 3,828,920.

The conveyors in the prior art are not susceptable to use in association with machinery having a rotatable work table, or rotary head, for example, where chips or the like are thrown radially outwardly from the rotating element. Such arrangements usually include a funnel-type trough which surrounds the work area and feeds the chips or the like to a chip conveyor located beneath the level of the rotating table. This arrangement is not convenient due to the fact that it interferes with equipment required beneath the rotating table or element to operate the machinery. Accordingly, it is Applicant's desire to provide a material collecting apparatus arranged to encircle at least a portion of the machine tool, preferably the rotating table portion or rotary head portion thereof, to collect the chips from the machine arrangement and discharge same through an outlet for convenient collection at a single location.

Accordingly, it is an object of this invention to provide a chip conveyor having an arcuate trough arrangement to facilitate the collection of material from a source having a material outlet which is also in an arcuate arrangement.

It is a further object of this invention to provide an arcuate trough wherein the arc is greater than approximately 45° and may exceed 360°, as in the form of a spiral.

It is a further object of this invention to provide arcuate guide means for guiding the plurality of interconnected plows in an arcuate path to facilitate a movement of the material collected in the trough in the arcuate path of the trough toward the outlet.

It is a further object of this invention to provide the trough with at least one outlet adjacent one end of the trough to facilitate the dispensing of the material collected in the trough in response to the back and forth motion of the plows.

It is a further object of this invention to provide a trough which is greater than 90° but less than 360°, and has a pair of arcuately spaced outlets, the material collected in the trough being moved through the trough by the arcuately movable plows away from the longitudinal central location of the trough in opposite directions toward the outlets.

It is a further object of this invention to locate the outlet for the trough at one or more locations to facilitate the handling of chips or the like collected from the outlet end of the conveyor.

It is a further object of this invention to provide a conveyor having retaining means or barbs which are safer to utilize and to clean than those of conventional equipment and are more efficient in effecting unidirectional movement of the conveyed material.

It is a further object of this invention to provide a conveyor having the aforesaid improvements and which is still relatively simple and inexpensive to produce.

SUMMARY OF THE INVENTION

In general, the objects and purposes of the invention are met by providing an apparatus for conveying material wherein the apparatus has an elongated and continuous arcuate trough, the top portion of which is substantially completely open for receiving material along its entire arcuate length. Arcuate guide means are mounted in the arcuate trough and extend along the length thereof. A plurality of interconnected plows are arcuately arranged and slidably mounted on the arcuate guide means. The centerpoint for the radius of the arcuate arrangement of trough and plows, being coincident on one side thereof. Power means are provided on the arcuate trough and driving linkage means are also provided for connecting the power means to the plows and arranged to move the plows back and forth in an arcuate path coextensive with the arcuate guide means. Material retaining means are provided in the arcuate trough for augmenting the unidirectional movement of the material by the plow means. Outlet means is located at at least one end of the arcuate trough for discharging the material collected in the trough in response to the back and forth motion of the plows.

BRIEF DESCRIPTION OF THE DRAWINGS

Further objects and purposes of this invention will be apparent to persons acquainted with apparatus of this general type upon reading the following specification and inspecting the accompanying drawings, in which.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words specifically mentioned, derivatives thereof and words of similar import.

DETAILED DESCRIPTION

Figure 1:
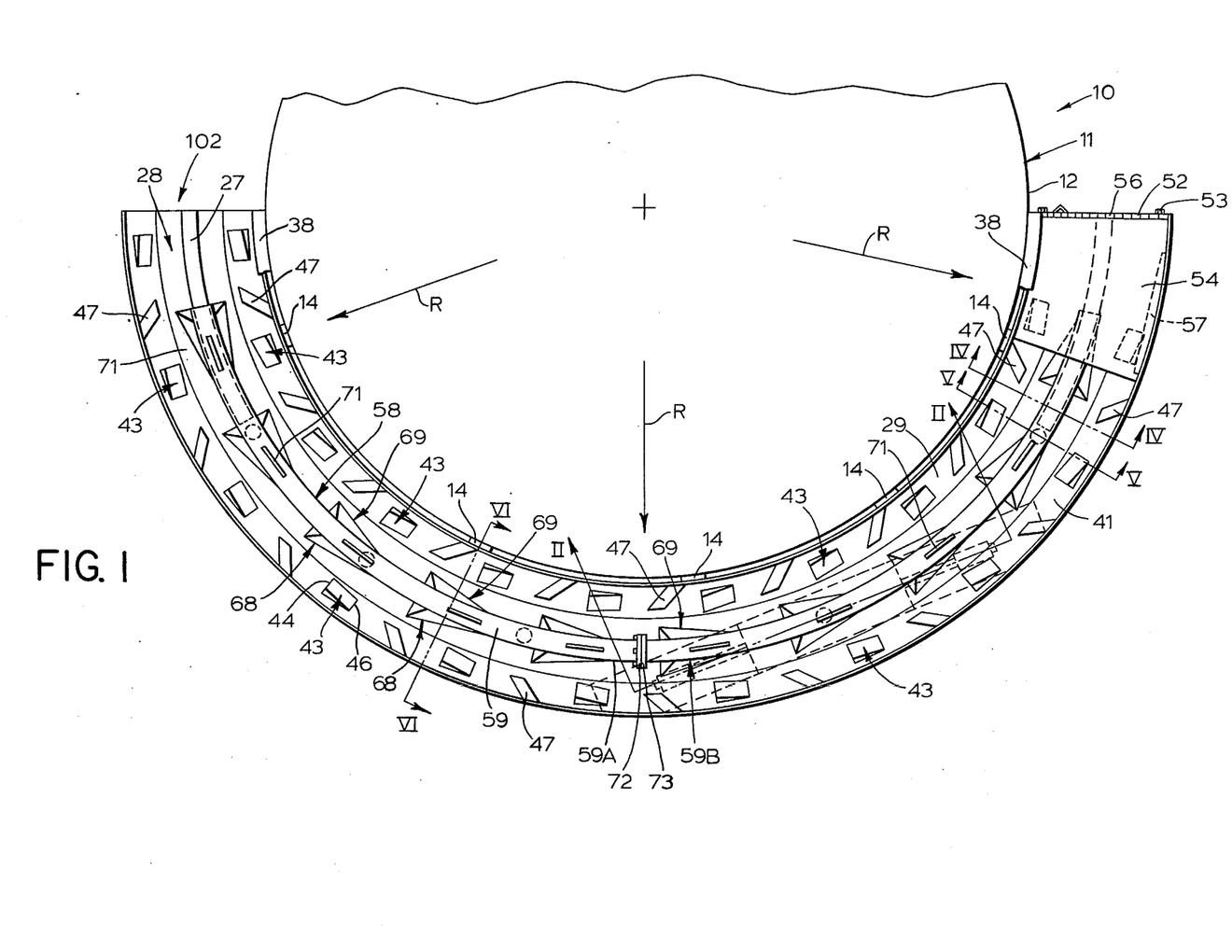
FIG. 1 is a top view of a harpoon conveyor arranged in an arcuate trough and embodying the invention.

A tool machine 10 is schematically illustrated in FIG. 1 and has a work table 11 which is either rotatable or is adapted to support a tool operation. The waste material from the tool operation is dispensed radially in the direction of the vectors R toward an arcuate edge 12 of the work table 11. A base 13 (FIG. 6) of the machine tool 10 is utilized for supporting the work table 11 in any convenient manner.

A plurality of support brackets 14 (FIG. 6) are provided and each have a generally vertically extending leg 16 and a horizontally extending leg 17. The vertical leg 16 of each of the brackets 14 is secured by any suitable means, such as a plurality of screws 18, to the base 13. If desired, a brace 19 may be secured to one side edge of the vertical leg 16 and the horizontal leg 17 and extend therebetween to provide additional support to maintain the horizontal leg 17 generally horizontally aligned. A plurality of openings 21 are provided in the brace 19 adjacent the horizontal leg 17 of the bracket 14. The edge 22 of the base 13 is arcuate and the centerpoint for the arc is coincident with the arc of the edge 12 of the work table. As a result, a plurality of such brackets are arcuately spaced as illustrated in FIG. 1 adjacent the arcuate edge 12 of the work table 11.

A base plate 23 is mounted on the upper surface of the horizontal leg 17 of the brackets 14. The base plate 23 has arcuate lateral edges 24 and 26, each of which has a radius the centerpoint of which is concentric with the centerpoint for the arcuate edges 12 and 22. An arcuate rail 27 is mounted on the upper surface of the base plate 23 and the centerpoint of the radius for the arcuate rail 27 is coincident with the centerpoint for the arcuate edges 12 and 22 as well as the arcuate edges 24 and 26 of the base plate 23. In this particular embodiment, the arcuate rail 27 is spaced equidistant from the lateral arcuate edges 24 and 26 of the base plate 23.

The base plate 23 forms the bottom wall of a trough 28. Arcuate side walls 29 and 31 extend upwardly from the arcuate edges 24 and 26 respectively, of the base plate 23. In this particular embodiment, the inclined wall portion 30 of the side wall 29 is inclined upwardly away from the arcuate edge 24 of the base plate 23 toward the arcuate edge 22 of the base 13. A vertically extending upper wall portion 32 is provided at the upper edge of the inclined wall 30. A plurality of openings (not illustrated) are provided in the wall portion 32 and are adapted to receive screws 33 or other fastening means which effect a securement of the upper edge of the sidewall 29 to the base 13. In this particular embodiment, a plurality of spacers 34 are utilized between the wall portion 32 and the arcuate edge 22 of the base 13. In addition, a generally L-shaped band 36 is secured between the spacers 34 and the arcuate edge 22 by fastening means, such as the screws 33. The leg 37 of the band 36 extends inclined to the horizontal and has a rubber flap 38 secured thereto by any convenient means, such as by a rivet 39. The radially outwardmost portion of the flap 38 extends over the upper edge of the wall portion 32 to prevent chips or the like from failling down between the space between the wall portion 32 and the arcuate edge 22 of the base 13.

The sidewall 31 extends upwardly from the arcuate lateral edge 26 of the base plate 23. In this particular embodiment, the vertically extending wall portion 41 extends vertically upward from an inclined wall portion 42 to a height that is generally equal to the height of the top surface of the work table 11.

A plurality of material retaining members 43 are secured to the sidewalls 29 and 31 in any convenient manner. In this particular embodiment, the material retaining members are generally wedge-shaped as illustrated in FIG. 1 with the thick edge 44 of the wedge 43 facing to the left and the thin edge 46 facing to the right. A plurality of barbs 47 are also secured to each of the sidewalls 29 and 31. In this particular embodiment, the barbs 47 are located, as viewed from the top, between the material retaining members 43 and are secured at the juncture between the upwardly inclined portions 30 and 42 of the sidewalls 28 and 31, respectively, and the vertical wall portions 32 and 41.

Figure 6:
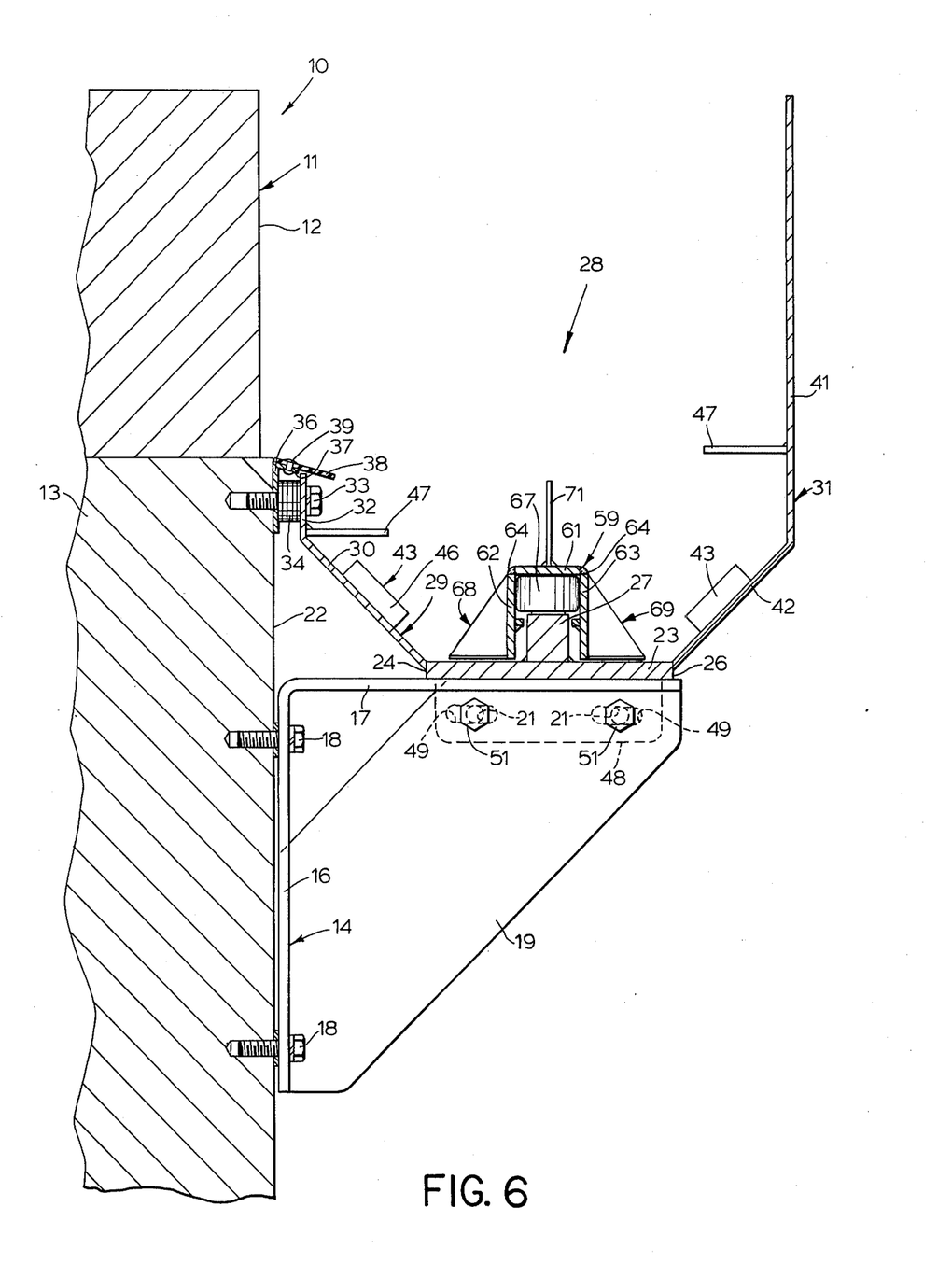
FIG. 6 is a sectional view taken along the line VI—VI of FIG. 1.

A flange 48 is secured to the bottom surface of the base plate 23 and extends downwardly therefrom as illustrated in FIG. 6. The flange 48 has a plurality of elongated slots 49 therein which are alignable with the openings 21 in the brace 19. Means, such as bolts 51, are received into the aligned openings 21 and slots 49 to effect a securement of the flange 48 and, consequently, the base plate 23 to the brace 19. The slots 49 facilitate a radially inward and outward adjustment of the base plate 23 to further facilitate a proper alignment of the trough 28 with the arcuate edges 12 and 22 of the machine tool 10.

An end flange 52 (FIG. 1) is secured by any convenient means, such as bolts 53, to the end of the sidewalls 29 and 31 (FIG. 1). A plate 54 is secured to the upper edge of the end wall 52 by a hinge 56 and is inclined downwardly along the sidewalls 29 and 31 and rest upon an inclined support surface 57. The purpose of the plate 54 is to prevent metal chips from falling beneath same to interfere with the reciprocating motion of the plow structure on the rail 27, which structure will be explained in more detail below.

Figure 4:
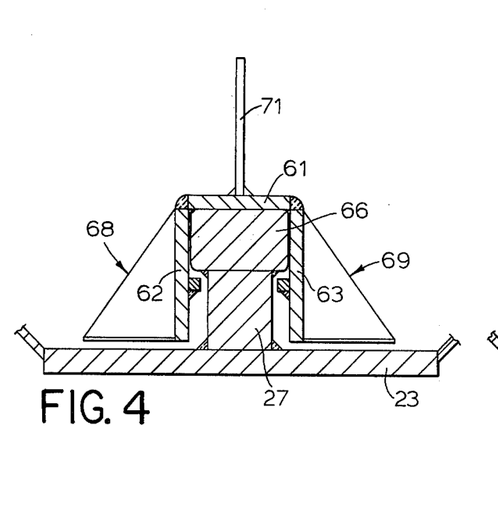
FIG. 4 is a sectional view taken along the line IV—IV of FIG. 1.
Figure 5:
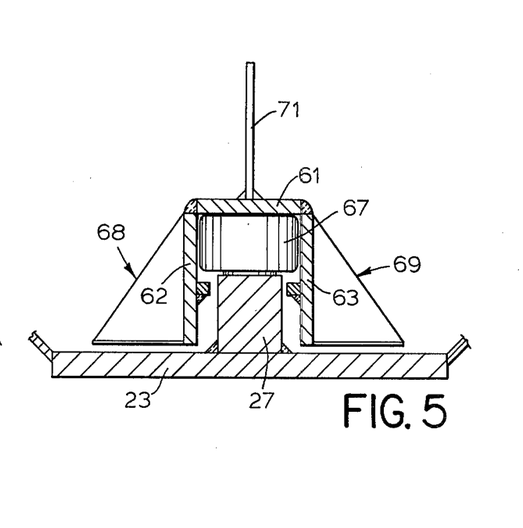
FIG. 5 is a sectional view taken along the line V—V of FIG. 1.

The plow structure is indicated generally by the reference numeral 58. The plow structure is composed of an inverted U-shaped slide member 59 having an upper generally horizontally aligned wall 61 and a pair of downwardly extending and parallel legs 62 and 63. It is conceivable that the inverted U-shaped slide member could also be made of an elongated hollow pipe wherein a slot has been cut along the sidewall thereof parallel with the axis such as is illustrated in FIGS. 5 and 6 of Patent No. 3,777,880. In this particular embodiment, the horizontally extending upper wall 61 of the slide member 59 has lateral arcuate edges which have a centerpoint for the radius which is coincident with the centerpoint for the arcuate edges 12 and 22. Similarly, the vertical legs 62 and 63 are both arcuate and the centerpoint for the arc is coincident with the centerpoint for the arcuate edges 12 and 22. The edges 62 and 63 are, in this particular embodiment, weldably secured as at 64 to the lateral arcuate edges of the horizontal wall 61 of the slide member 59. The legs 62 and 63 straddle the arcuate rail 27 as illustrated in FIGS. 4 to 6. The legs 62 and 63 are maintained equally spaced from the vertical sidewalls of the arcuate rail 27 by fixed guide members 66 (FIG. 4) and rotatable rollers 67 (FIGS. 5 and 6). The diameter of the roller 67 is slightly larger than the lateral width of the guide members 66 or close to being equal in size so that the vertical legs 62 and 63 are maintained equally spaced from the vertical sidewalls of the arcuate rail 27. Plow members 68 and 69 are secured to the legs 62 and 63, respectively, as illustrated in FIGS. 4 to 6. A vertical barb 71 is weldably secured to the upper surface of the horizontal wall 61 of the slide member 59.

If desired, the slide member 59 can be manufactured in two parts 59A and 59B (FIG. 1). Mating flanges 72 and 73 can be provided on the mutually adjacent ends of the slide members 59A and 59B, respectively, and secured by any convenient means, as by bolts or the like. As a result, an inverted slide member 59 can be provided on the arcuate rail 27 and extending less than the total arcuate length of the trough 28 but over a majority of the overall length thereof.

Figure 2:
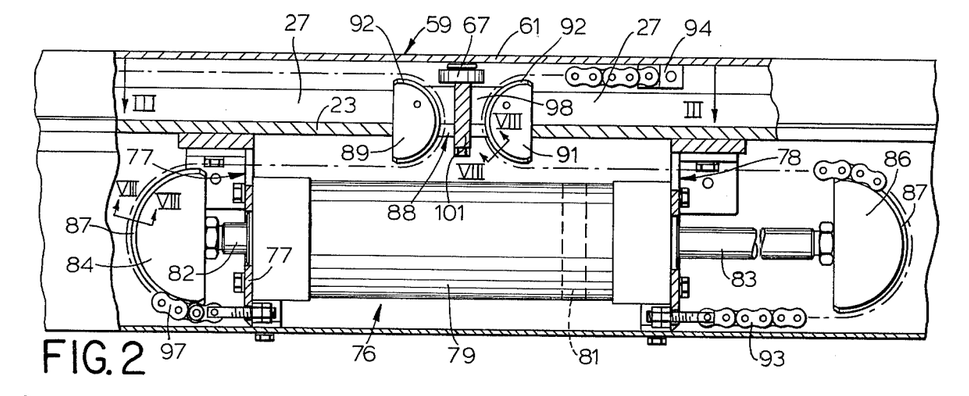
FIG. 2 is a sectional view taken along the line II—II of FIG. 1.
Figure 3:
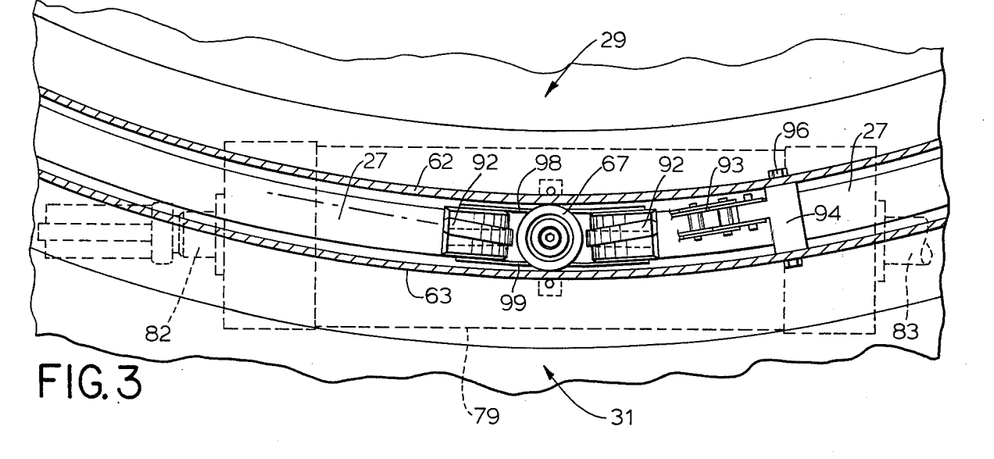
FIG. 3 is a sectional view taken along the line III—III of FIG. 2.
Figure 8:
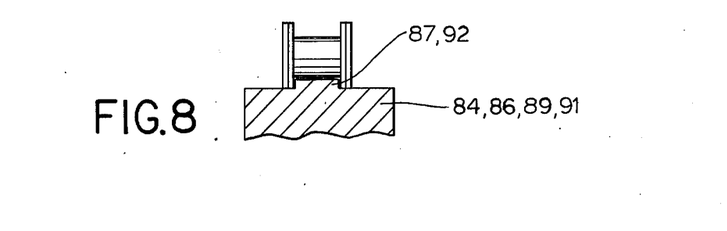
FIG. 8 is a sectional view taken along the two section lines VIII—VIII of FIG. 2.

The drive system 76 for reciprocating or oscillating the plow structure 58 along the arcuate rail 27 is illustrated in FIGS. 2 and 3. A pair of arcuately spaced brackets 77 and 78 are secured to the bottom surface of the base plate 23. A hydraulic or air operated power cylinder 79 is fixedly connected to and extends between the brackets 77 and 78. A piston 81 is reciprocal within the cylinder 79 and has a pair of piston rods 82 and 83 secured thereto in the usual manner. A slide block 84 is secured to the free end of the piston rod 82 and another slide block 86 is secured to the free end of the piston rod 83. Each slide block 84 and 86 has a raised rib 87 thereon (FIG. 8). The shape of the slide blocks 84 and 86 are generally close to one-half of a disk wherein the arcuate edge of the disk faces away from the body of the cylinder 79. The axis of the arcuate surface on the slide blocks 84 and 86 extends horizontally perpendicular to the longitudinal axis of the cylinder 79. The ribs 87 on each of the slide blocks 84 and 86 extends equidistant from the lateral edges of the blocks as illustrated in FIG. 8 over the length of the rib.

An opening 88 is provided in the base plate 23. A portion of the arcuate rail 27 is removed and the mutually adjacent ends of the arcuate rail 27 are provided with slide blocks 89 and 91. In this particular embodiment, the slide block 89 is secured to the left portion of the arcuate rail 27 (FIG. 2) and the slide block 91 is secured to the right arcuate rail 27. The slide blocks 89 and 91 each have a rib 92 (FIG. 8) thereon similar to the rib 87 on the slide blocks 82 and 83. However, the rib 92, in this particular embodiment, is shifted to one side adjacent the upper edge as best illustrated in FIG. 3. In other words, the upper end of the rib 92 is shifted so that it is closer to one of the lateral edges of the slide block 89 or 91. The same is true at the lower end of the rib 92 but the shifting is to the opposite lateral edge. A chain 93 is secured at one end to the bracket 78 and extends around the slide block 86 on the rib 87 and around the slide block 91 on the rib 92 and is secured at the other end to a bracket 94 fixed to the sidewalls 62 and 63 of the inverted U-shaped slide member 59 as illustrated in FIG. 3 by a bolt 96. Similarly, a second chain 97 secured at one end to the bracket 77 and extends around the slide block 84 on the rib 87 and around the slide block 89 on the rib 92 to another bracket similar to the bracket 94 which is in turn fixed to the sidewalls 62 and 63 of the inverted U-shaped slide member 59. As a result, a reciprocation of the piston 81 in the cylinder 69 will effect a longitudinal shifting of the slide blocks 84 and 86 to effect a reciprocation of the slide member 59 relative to the arcuate guide rail 27. The reciprocal motion of the piston 81 in the cylinder 79 is converted via the slide blocks 84, 86, 89 and 91 to an arcuate movement of the slide member 59 on the arcuate rail 27. The chain links of the chains 93 and 97 are capable of lateral shifting to facilitate their movement over the slide blocks.

Sidewalls 98 and 99 are secured to and extend between the slide blocks 89 and 91 on opposite sides of the opening 88 as best illustrated in FIG. 3. The legs 62 and 63 of the slide member 59 straddle the sidewalls 98 and 99 as also illustrated in FIG. 3.

A roller 67 is supported on a bracket 101 which is, in turn, secured by screws or the like to the under surface of the base plate 23 of the trough 28. The roller 67 as well as the guide members 66 maintain a spacing between the upper surface of the arcuate rail 27 and the under surface of the horizontal wall 61 of the slide member 59 as well as maintaining an equal spacing between the lateral sidewalls of the arcuate rail 27 and the internal walls of the legs 62 and 63 of the slide member 59.

An outlet 102 (FIG. 1) is provided from the trough 28. The outlet 102 is located at the end of the trough 28 remote from the end wall 52.

Figure 7:
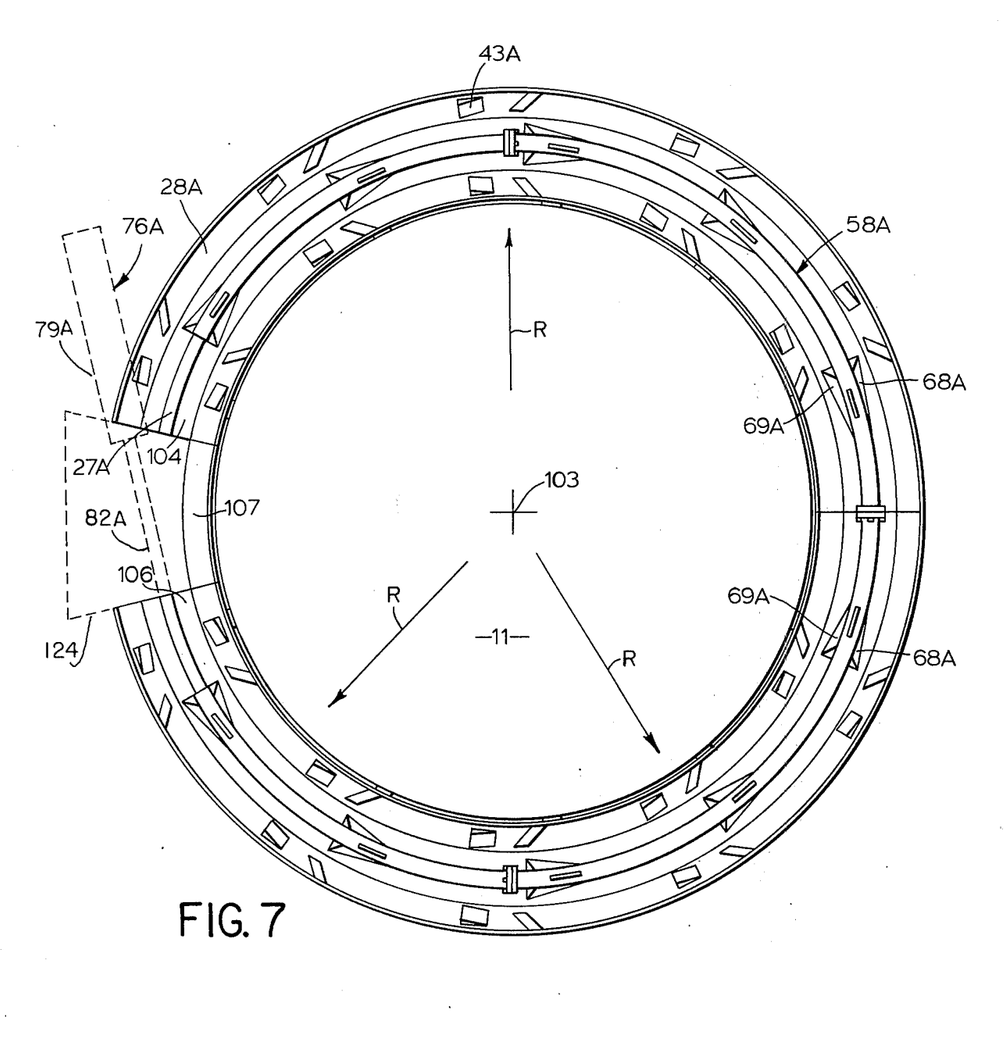
FIG. 7 is a top view of a harpoon conveyor arranged in an arcuate trough wherein the arc is greater than 270° but less than 360°.

FIG. 7 illustrates a modified embodiment of the arcuate trough 28A. In this particular embodiment, the total extent of the arcuate trough 28A is greater than 90° but less than 360°. The arcuate trough illustrated in FIG. 1, on the other hand, is approximately 180°. The structure of the trough 28A is generally similar to the structure of the trough described hereinabove with respect to FIG. 1 and further comment about the sidewall structure of the trough, the arcuate rail 27A and the plow structure 58A is believed to be unnecessary. The same type of drive that has been described above is also applicable in driving the plow structure 58A back and forth along the arcuate rail 27A. If desired, the drive can be altered to an end drive such as is shown in broken lines at 76A. A power cylinder 79A has a piston rod 82A which is secured in a conventional manner to the end of the arcuate rail 27A. A plate or chute 124 is secured to the ends of the trough 28A and extends therebetween the divert the chips or the like away from the end drive mechanism 76A. This type of drive arrangement can be used when it is not possible to locate the drive beneath the central portion of the trough due its being occupied by other equipment or is not readily accessible.

The material retaining members 43A are oriented in opposite directions on opposite sides of a horizontal line extending through the center 103 of the work table 11. In addition, the orientation of the plow members 68A and 69A are also reversed on opposite sides of the horizontal line passing through the center 103 of the work table 11. As a result, and upon reciprocation or oscillation of the plow structure 58A, the material collected within the trough 28A is urged in opposite directions from the horizontal line passing through the centerpoint 103 of the work table 11 toward a pair of arcuately spaced outlets 104 and 106. A receptacle may be placed beneath the outlets 104 and 106 to facilitate a collection of the material and removal at convenient times. A baffle plate 107 is secured to the arcuate edge 22 of the base 13 to direct the material into the container located beneath the outlets 104 and 106.

OPERATION

Although the operation of the device embodying the invention will be evident from the abovedescription, such operation will be briefly described hereinbelow for convenience.

The pressure fluid operated cylinder assembly 79 is energized to effect a periodic reciprocation of the piston 81 therein. This results in a reciprocation of the piston rods 82 and 83 to move the slide blocks 84 and 86 in a direction parallel to the longitudinal axis of the cylinder 79. Since the chains are connected between the brackets 77,78 and the inverted U-shaped slide member 59, a movement of the slide blocks 84 and 86 will effect a shifting of the slide member 59 relative to the arcuate rail 27. As a result, the plow members 68 and 69 on the plow structure 58 will be moved first in a direction to move beneath any chips collected in the trough 28 and subsequently, due to reciprocation of the piston in the opposite direction, the plow members 68 and 69 on the plow structure will move in the opposite direction to effect a movement of the material or chips in a clockwise direction in FIG. 1 and in both a clockwise direction in the lower half of FIG. 7 and a counterclockwise direction in the upper half of FIG. 7. As a result, the material which is distributed radially in direction of the vectors R in FIGS. 1 and 7 will be collected in the trough 28 and distributed to a single outlet 102 or a pair of outlets 104 and 106.

MODIFIED PLOW CONSTRUCTION

Figure 9:
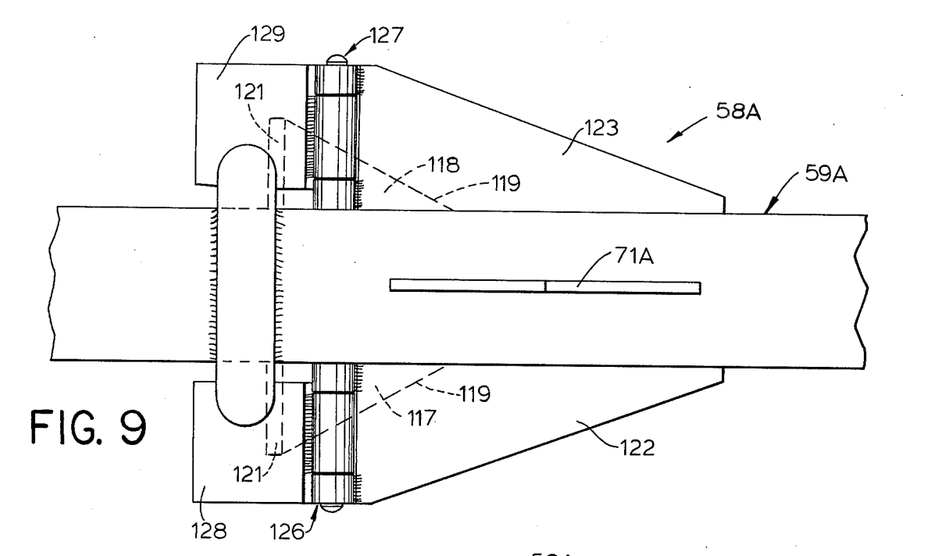
FIG. 9 is a top view of a modified plow construction.
Figure 10:
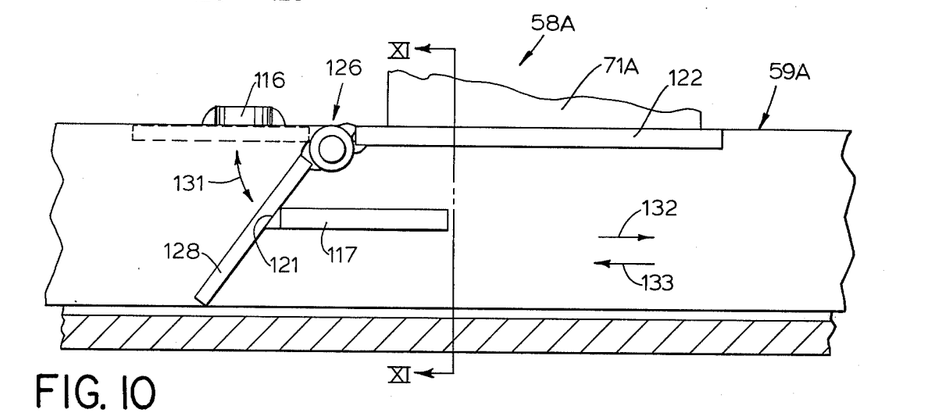
FIG. 10 is a side elevational view of the modified plow construction.
Figure 11:
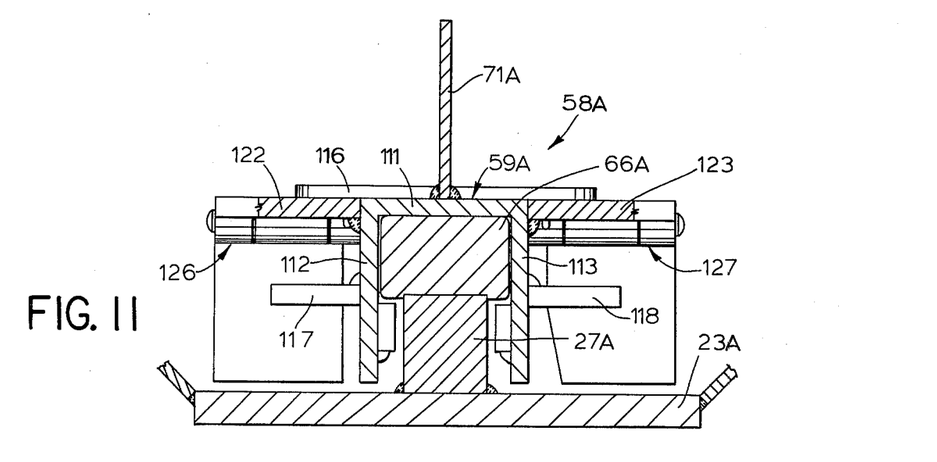
FIG. 11 is a sectional view taken along the line XI—XI in FIG. 10.

A modified plow construction 58A is illustrated in FIGS. 9 to 11. The component parts of the modified plow construction 58A will be referred to by the same reference numerals designating corresponding parts of the plow structure 58 but with the suffix "A" added thereto.

A rail 27A is mounted on the upper surface of the base plate 23A as illustrated in FIG. 11. In this particular embodiment, the rail 27A can be either a straight rail or an arcuate rail. If the rail 27A is arcuate, it is spaced equidistant from the lateral arcuate edges of the base plate 23A and the centerpoint of the radius for the arcuate rail 27A is coincident with the centerpoint for the edges of the work table and the base. A guide member 66A is secured to the upper surface of the rail 27A. If desired, rotatable rollers (not illustrated in this embodiment) may be secured to the upper surface of the guide member 66A as was described above with reference being made to FIG. 5 and the rollers 67.

A plow structure 58A is composed of an inverted U-shaped slide member 59A having an upper generally horizontally aligned wall 111 and a pair of downwardly extending and parallel legs 112 and 113. The legs 112 and 113 straddle the rail 27A as illustrated in FIG. 11. The legs 112 and 113 are maintained equally spaced from the vertical sidewalls of the rail 27A by the fixed guide member 66A.

The slide member 59A is reciprocally movable relative to the rail 27A. A vertical barb 71A is weldably secured to the upper surface of the horizontal wall 111 of the slide member 59A. If the rail 27A is arcuate, the drive structure discussed in the preceding embodiment can be utilized. If the rail is straight, other conventional types of drive systems can be utilized.

An upper stop member 116 is secured to the upper surface of the horizontal wall 111 and extends laterally beyond the lateral edges of the legs 112 and 113. In this particular embodiment, the upper stop 116 is located just forward of the vertical barb 71A. A pair of lower stop members 117 and 118 are secured to the laterally facing sides of the legs 112 and 113. More particularly, the lower stop member 117 is secured to the outwardly facing side of the leg 112 and the lower stop member 118 is secured to the outwardly facing side of the leg 113. The lower stop members 117 and 118 are generally coplanar and are spaced downwardly from the horizontal wall 111, particularly below the lower surface of the upper stop 116. In addition, the forward edge (here the left edge in FIG. 10), is generally vertically aligned with the rear edge, (here the right edge in FIG. 10), of the upper stop 116. The trailing edges 119 of both of the lower stop members 117 and 118 are tapered toward the outwardly facing sides of the legs 112 and 113 as illustrated in broken lines in FIG. 9. Thus, the lower stop members 117 and 118 are generally triangularly shaped with the apex of the triangle being formed by the juncture between the trailing edges 119 and the outwardly facing sides of the respective legs 112 and 113. The forward edge of each of the lower stop members 117 and 118 has an inclined surface 121 thereon. The inclination of the inclined surface 121 from the upper surface to the lower surface is downwardly and forwardly.

A pair of generally triangularly shaped plates 122 and 123 are each secured to the outwardly facing sides of the legs 112 and 113 generally above the lower stop members 117 and 118. The upper surface of the plates 122 and 123 is generally flush with the upper surface of the horizontal wall 111 of the slide member 59A. The forward edge, (here the left edge in FIG. 10), is spaced rearwardly from the inclined surfaces 121 on the stop members 117 and 118. The apex of the triangularly shaped plates 122 and 123, in this particular embodiment, is located rearwardly from the front edge of the plates 122 and 123 and the trailing edges thereof, like the trailing edge 119 on the lower stop members 117 and 118 extend in a direction closely similar to the direction of the trailing edges 119.

A hinge construction 126 is secured to the forward edge of the plate 122 and a hinge construction 127 is secured to the forward edge of the plate 123. A plow member 128 is hingedly secured to the hinge construction 126 and a plow member 129 is secured to the hinge construction 127. Both of the plow members 128 and 129 are pivotal with respect to the plates 122 and 123 between the limits defined by the inclined surface 121 and the lower surface of the lateral ends of the upper stop member 116 as illustrated by the double-ended arrow 131 in FIG. 10. Thus, the utilization of the modified plow construction 58A in the environment illustrated in the preceding embodiment will cause the plow members 128 and 129 to pivot upwardly to the broken line position illustrated in FIG. 10 upon a movement of the slide member 59A in the direction of the arrow 132 in FIG. 10. That is, the material in the conveyor will engage the plow members 128 and 129 upon a movement thereof in the direction of the arrow 132 to cause the plow members 128 and 129 to pivot to the broken line position as illustrated in FIG. 10. Thereafter, a movement of the slide member in the opposite direction, namely in a direction indicated by the arrow 133 in FIG. 10 will cause the plow members 128 and 129 to engage the material in the conveyor and the plow members 128 and 129 will both move from the broken line position illustrated in FIG. 10 to the solid line position.

It is also possible with the structure disclosed herein to provide a spiral trough wherein the total extent thereof is greater than 360°.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for conveying material deposited therein, comprising:
    an elongated and continuous arcuate trough, the top portion of which is substantially completely open for receiving material along its arcuate length, the centerpoint for the radius of said arcuate trough being located on one side thereof;
    arcuate rail means mounted in an extending along an arcuate path in said arcuate trough;
    arcuate and rigid slide means slidably mounted on said arcuate rail means, the centerpoint for the radius of the arcuate arrangement of said rail means and said slide means coinciding with the centerpoint of the radius for said arcuate trough;
    a plurality of plows mounted on said arcuate slide means at spaced intervals;
    reciprocal power means associated with said arcuate trough and driving linkage means for connecting said reciprocal power means to said arcuate slide means and arranged to move said arcuate slide means and said plows thereon back and forth along said arcuate path, said linkage means including guide means for converting the reciprocal drive of said power means into an arcuate drive for said arcuate slide means in both directions of movement thereof;
    material retaining means in said arcuate trough encouraging unidirectional movement of said material in said trough by said plows on said arcuate slide means; and
    outlet means from at least one end of said arcuate trough for discharging said material from said arcuate trough.

2. An apparatus for conveying material according to claim 1, wherein said power means includes a stationary cylinder and connecting means for connecting said cylinder to a wall of said arcuate trough and a piston mounted therein for reciprocal movement and a piston rod affixed thereto at at least one end thereof, the axis along which said piston is reciprocal being at an angle relative to the arcuate rail means and the back and forth path of movement of said plows.

3. An apparatus for conveying material according to claim 2, wherein said linkage means includes an elongated chain connecting said piston rod to said arcuate slide means, said chain having a sufficient degree of lateral flexibility, said guide means including a guide for guiding said chain during the transition of said drive from said reciprocal movement to said arcuate movement.

4. An apparatus for conveying material according to claim 3, wherein said guide includes slide block means for guiding said chain in an S-shaped path.

5. An apparatus for conveying material according to claim 4, wherein said chain is fixedly connected at one end to said cylinder and at the other end to said plow means;
    wherein said slide block means includes a first block mounted on said piston rod and movable therewith and engages said chain intermediate the length thereof to define one of the bends in said S-shaped thereof and a fixed second block secured to said arcuate trough and engaging said chain to define the other bend in said S-shaped path thereof, said second block having a track thereon for guiding said chain during said transition.

6. An apparatus for conveying material according to claim 3, wherein said drive means includes a second piston rod extending outwardly from the opposite end of said cylinder;
    wherein said linkage means includes a second elongated chain connecting said second piston rod to said arcuate slide means;
    wherein said guide means includes a pair of guides for guiding the first mentioned chain and said second chain during the transition of said drive from said reciprocal movement to said arcuate movement, each of said guides including slide block means for guiding said chains in an S-shaped path; and
    wherein one end of both chains are fixed to said cylinder and at the other end to said arcuate slide means whereby a reciprocation of said piston in said cylinder effects a driving of said arcuate slide means in both directions along said arcuate rail means.

7. An apparatus for conveying material according to claim 6, wherein said material retaining means includes two sets of material retainers, one set being provided on part of said trough and urging movement of said material in one direction, the other set being provided on another part of said trough and urging movement of said material in the opposite direction.

8. An apparatus for conveying material according to claim 1, wherein said outlet means includes a single outlet from said arcuate trough.

9. An apparatus for conveying material according to claim 1, wherein the arc of said arcuate trough is approximately between 45° and 360°.

10. An apparatus for conveying material according to claim 1, wherein the arc of said arcuate trough is greater than 180° and less than 360°.

11. An apparatus for conveying material according to claim 1, wherein said plows each include a plow member extending laterally of said trough and being supported for pivotal movement between a position blocking said trough and a position free from blocking said trough.

12. An apparatus for conveying material according to claim 11,
    wherein each of said plow members is pivotally secured to said arcuate slide means about a generally horizontal axis.

13. An apparatus for conveying material according to claim 12, wherein said horizontal pivot axis is generally aligned with the upper surface of said arcuate rail means and perpendicular to the direction of movement for said arcuate slide means.

14. An apparatus for conveying material according to claim 11,
    wherein each of said plows includes a pair of plow members pivotally secured to said arcuate slide means and on opposite sides of said arcuate slide means.

15. An apparatus for conveying material according to claim 14, wherein said pair of plow members are both pivotal about coaxial axes between said blocking and nonblocking positions relative to said trough.

16. An apparatus for conveying material according to claim 15, wherein said pivot axes extend generally horizontal adjacent the upper edge of the arcuate rail means and perpendicular to the direction of movement for said arcuate slide means.

* * * * *